(12) United States Patent
Molisch et al.

(10) Patent No.: US 7,912,014 B2
(45) Date of Patent: Mar. 22, 2011

(54) METHOD AND APPARATUS FOR REDUCING INTERFERENCE IN MULTIPLE-INPUT-MULTIPLE-OUTPUT (MIMO) SYSTEMS

(75) Inventors: Andreas Molisch, North Plainfield, NJ (US); Martin Vivian Clark, Boston, MA (US); Huaiyu Dai, Cary, NC (US); Moe Z. Win, Cambridge, MA (US); Jack Harriman Winters, Middletown, NJ (US)

(73) Assignee: AT&T Intellectual Property II, LP

( * ) Notice: Subject to any disclaimer, the term of this patent is extended or adjusted under 35 U.S.C. 154(b) by 2142 days.

(21) Appl. No.: 10/255,441

(22) Filed: Sep. 26, 2002

(65) Prior Publication Data
US 2003/0214917 A1  Nov. 20, 2003

Related U.S. Application Data

(60) Provisional application No. 60/325,730, filed on Sep. 28, 2001.

(51) Int. Cl.
*H04W 4/00* (2009.01)
(52) U.S. Cl. .................................................... 370/334
(58) Field of Classification Search .............. 370/329, 370/331–338, 286, 207, 342, 280, 352, 350–353, 370/392, 335, 399, 242, 441, 320, 401, 395, 370/400; 455/562.1, 277, 101, 561, 272, 455/67.16, 296, 447, 525, 423, 63, 67, 403, 455/436, 560, 433, 442, 515, 411, 522, 450; 375/267, 299, 347, 346, 349, 148, 260, 140–144, 375/130, 254, 278, 284, 350, 358, 216, 242, 375/262; 379/417, 416
See application file for complete search history.

(56) References Cited

U.S. PATENT DOCUMENTS

| | | | | |
|---|---|---|---|---|
| 5,481,544 A * | 1/1996 | Baldwin et al. | ................ | 370/392 |
| 5,566,209 A * | 10/1996 | Forssen et al. | ................. | 375/262 |
| 5,740,208 A * | 4/1998 | Hulbert et al. | ................. | 375/346 |
| 5,933,768 A * | 8/1999 | Skold et al. | .................... | 455/296 |
| 5,936,950 A * | 8/1999 | Hottinen | ......................... | 370/342 |
| 6,167,039 A * | 12/2000 | Karlsson et al. | .............. | 370/342 |
| 6,175,737 B1 | 1/2001 | Kao | | |
| 6,230,023 B1 * | 5/2001 | Slanina | .......................... | 455/522 |
| 6,289,221 B1 * | 9/2001 | Ritter | ............................. | 455/447 |

(Continued)

OTHER PUBLICATIONS

METRA, Definition of power control, channel estimation and SIR estimation principles, Oct. 26, 2000, entire document. Doc. No. IST-1999-112729/NET-WP3-D3-3-V1.1.doc.*

(Continued)

*Primary Examiner* — Pankaj Kumar
*Assistant Examiner* — Prenell P Jones

(57) ABSTRACT

Interference is reduced with a multiple-input-multiple-output (MIMO) system having a set of basestations including a first basestation and a second basestation is reduced. Signals associated with the first basestation having its own antenna elements are received. The first basestation is associated with its own mobile stations each having their own antenna elements. Each signal associated with the first basestation is uniquely associated with a mobile station associated with the first basestation. Signals associated with the second basestation having its own antenna elements are received. The second basestation is associated with its own mobile stations each having their own antenna elements. Each signal associated with the second basestation is uniquely associated with a mobile station associated with the second basestation. Signals associated with the first basestation are jointly detected in conjunction with the signals associated with the second basestation to produce a set of detected signals.

6 Claims, 8 Drawing Sheets

U.S. PATENT DOCUMENTS

| | | | |
|---|---|---|---|
| 6,301,289 B1 * | 10/2001 | Bejjani et al. | 375/144 |
| 6,317,586 B1 * | 11/2001 | Haardt | 455/67.16 |
| 6,320,862 B1 * | 11/2001 | Nitta | 370/401 |
| 6,424,643 B1 * | 7/2002 | Gutowski | 370/342 |
| 6,463,294 B1 * | 10/2002 | Holma et al. | 455/513 |
| 6,483,826 B1 * | 11/2002 | .ANG.kerberg | 370/335 |
| 6,519,457 B1 * | 2/2003 | Jiang et al. | 455/442 |
| 6,529,495 B1 * | 3/2003 | Aazhang et al. | 370/342 |
| 6,763,225 B1 * | 7/2004 | Farmine et al. | 455/67.16 |
| 6,771,619 B2 * | 8/2004 | Tiihonen et al. | 370/329 |
| 6,782,255 B1 * | 8/2004 | Ranta et al. | 455/423 |
| 6,917,597 B1 * | 7/2005 | Schmidl et al. | 370/280 |
| 6,947,473 B1 * | 9/2005 | Rademacher | 375/148 |
| 7,327,713 B2 * | 2/2008 | Wang et al. | 370/342 |
| 2003/0026229 A1 * | 2/2003 | Larson et al. | 370/338 |
| 2004/0146024 A1 * | 7/2004 | Li et al. | 370/334 |
| 2004/0190603 A1 * | 9/2004 | Dabak et al. | 375/148 |
| 2005/0250505 A1 * | 11/2005 | Rasanen | 455/450 |

OTHER PUBLICATIONS

PCT Search Report regarding Internartional Application PCT/ US 02/30556 dated Sep. 26, 2002.

* cited by examiner

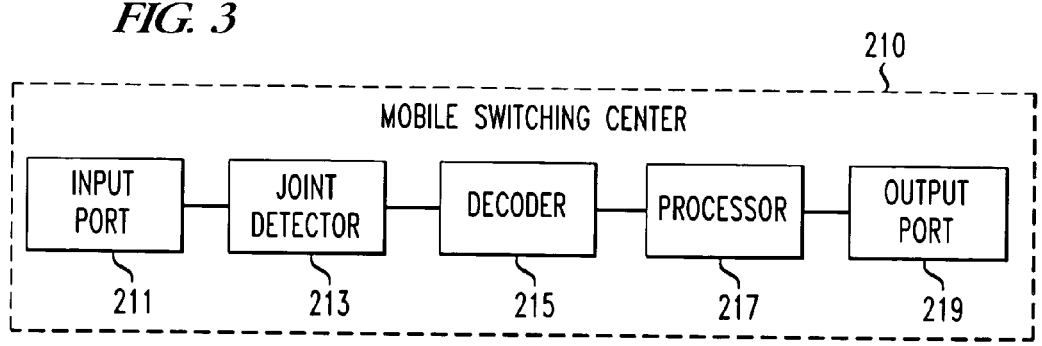
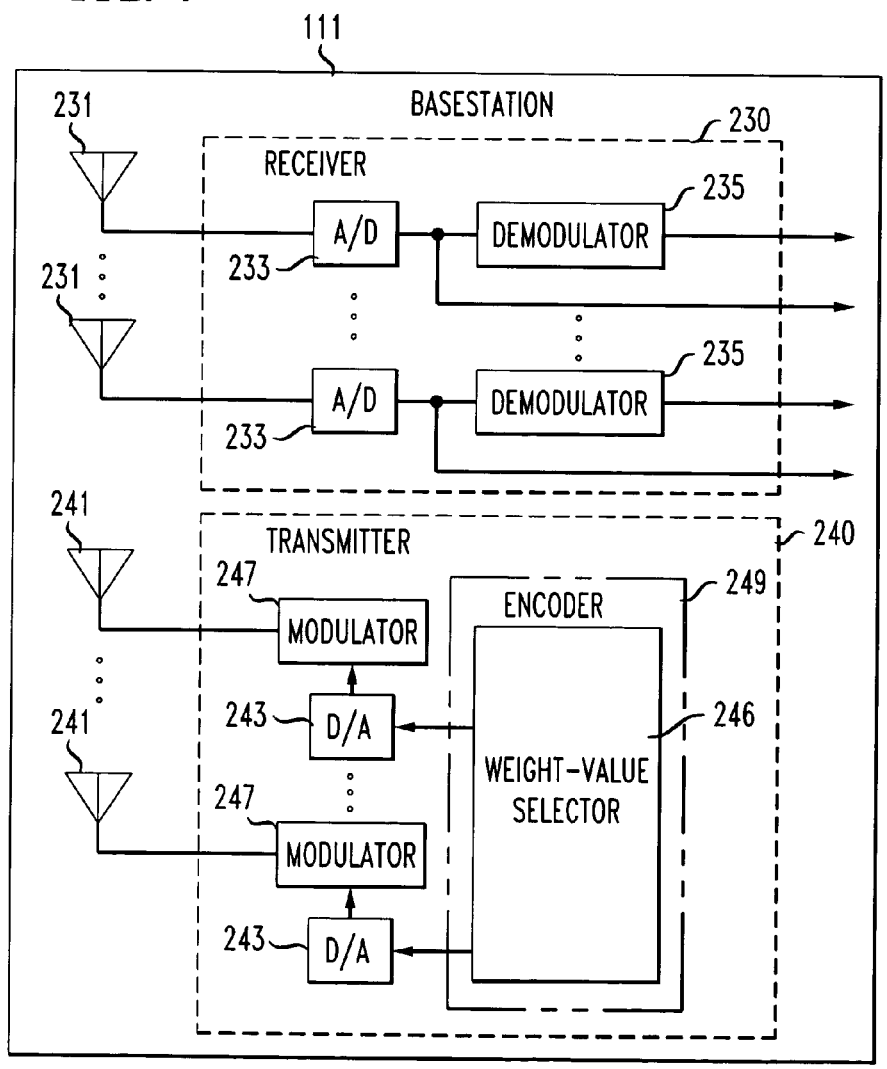

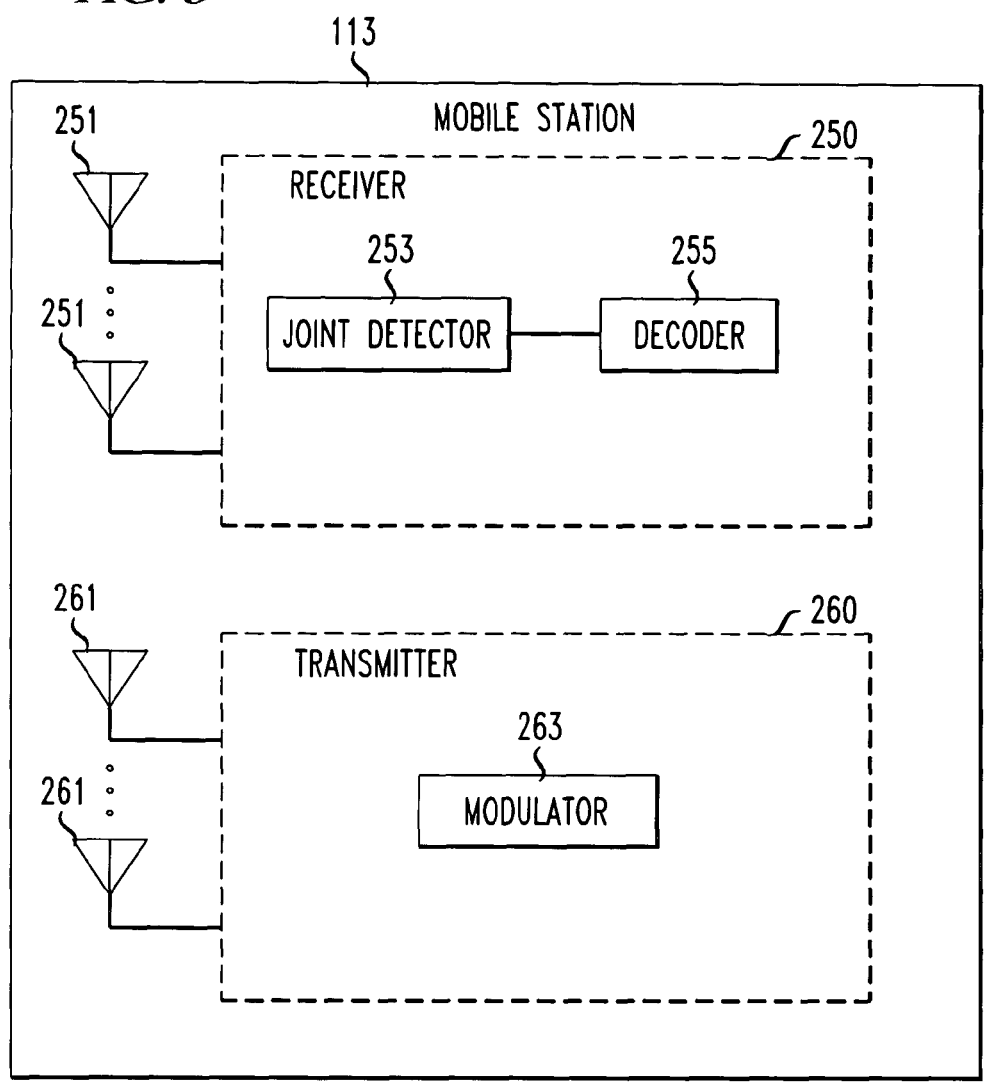

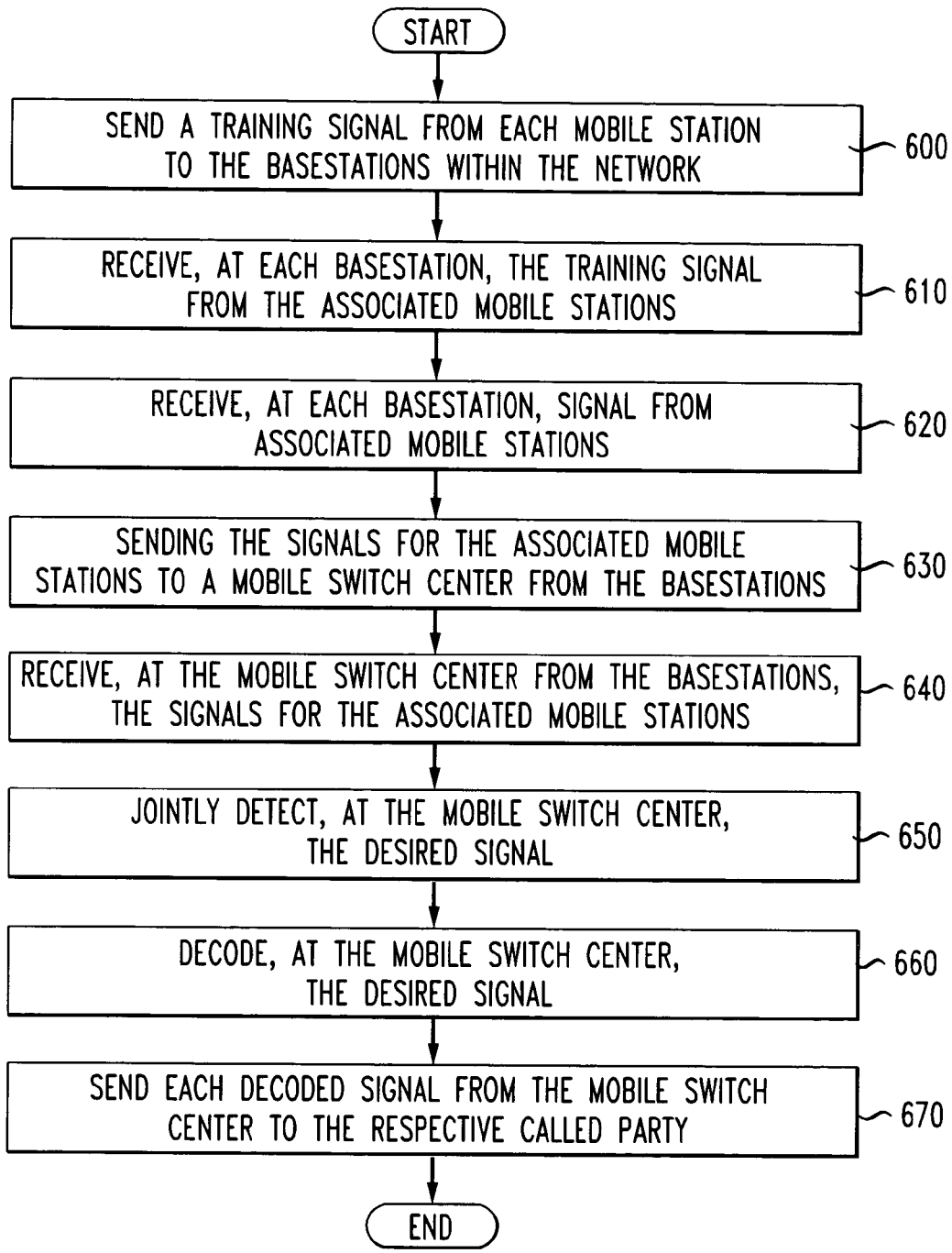

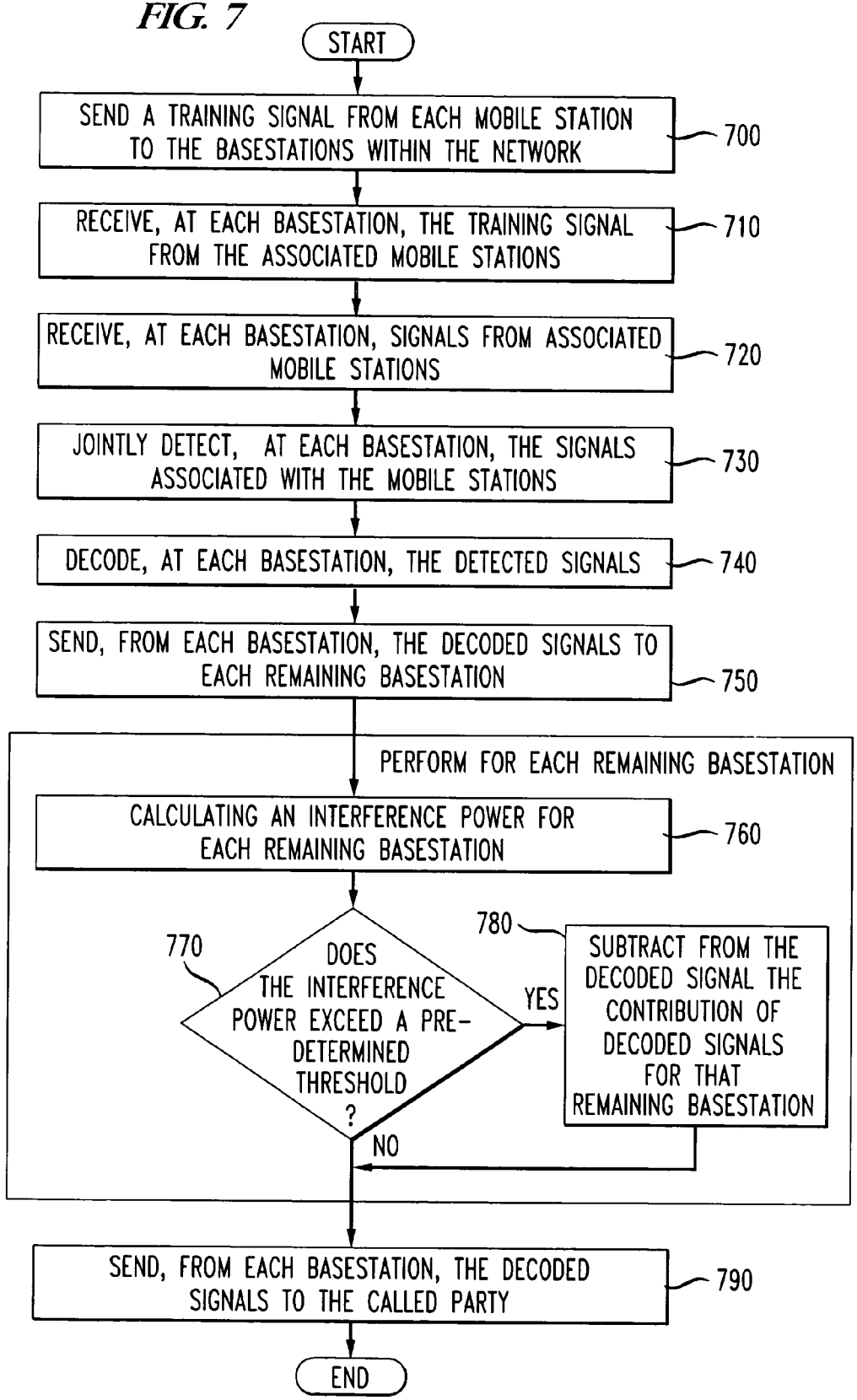

METHOD AND APPARATUS FOR REDUCING INTERFERENCE IN MULTIPLE-INPUT-MULTIPLE-OUTPUT (MIMO) SYSTEMS

CROSS-REFERENCE TO RELATED APPLICATIONS

This application is related to a U.S. Patent Provisional Application No. 60/325,730, entitled "Use of Information Exchange Between Base Stations in Multiple-Input-Multiple-Output (MIMO) Systems," filed on Sep. 28, 2001, the entirety of which is incorporated herein by reference.

BACKGROUND

The invention relates generally to wireless communication systems and more particularly to a system and method of reducing interference in a wireless multiple-input-multiple-output (MIMO) system.

In a cellular system, a basestation is uniquely associated with each cell. Each basestation communicates with mobile stations within its associated cell. In one embodiment, a cell defines a geographical area. With MIMO systems, different data signals can be sent from multiple transmitting antenna elements at a transmitter (e.g., a basestation) to multiple receiving antenna elements at a receiver (e.g., a mobile station). Such MIMO systems can increase the data capacity of a cellular system over the data capacity of a non-MIMO based system.

Interference with a desired signal, however, can result at a receiver when undesired signals are also received. In a cellular system, a receiver can receive signals both from a desired transmitter (e.g., the basestation within the same cell) and undesired transmitters (e.g., basestations from neighboring cells), thereby resulting in interference. Simulations have shown that in interference-limited environments, the capacity of MIMO systems may not be larger than the capacity of systems with multiple antennas at one link end only.

Thus, an improved system and method is needed to reduce the interference caused by multiple transmissions received by a receiver in a MIMO system.

SUMMARY OF THE INVENTION

Interference is reduced with a multiple-input-multiple-output (MIMO) system having a set of basestations including a first basestation and a second basestation is reduced. Signals associated with the first basestation having its own antenna elements are received. The first basestation is associated with its own mobile stations each having their own antenna elements. Each signal associated with the first basestation is uniquely associated with a mobile station associated with the first basestation. Signals associated with the second basestation having its own antenna elements are received. The second basestation is associated with its own mobile stations each having their own antenna elements. Each signal associated with the second basestation is uniquely associated with a mobile station associated with the second basestation. Signals associated with the first basestation are jointly detected in conjunction with the signals associated with the second basestation to produce a set of detected signals.

BRIEF DESCRIPTION OF THE DRAWINGS

FIG. 3 depicts a block diagram of the mobile switching center shown in FIG. 2.

FIG. 4 depicts a block diagram of the basestation shown in FIG. 2.

FIG. 5 depicts a block diagram of the mobile station shown in FIG. 2.

FIG. 6 depicts a flowchart showing a method for exchanging information among basestations in an uplink configuration, according to an embodiment of the invention.

FIG. 7 depicts a flowchart showing a method for exchanging information among basestations in an uplink configuration, according to another embodiment of the invention.

DETAILED DESCRIPTION

Figure 1:
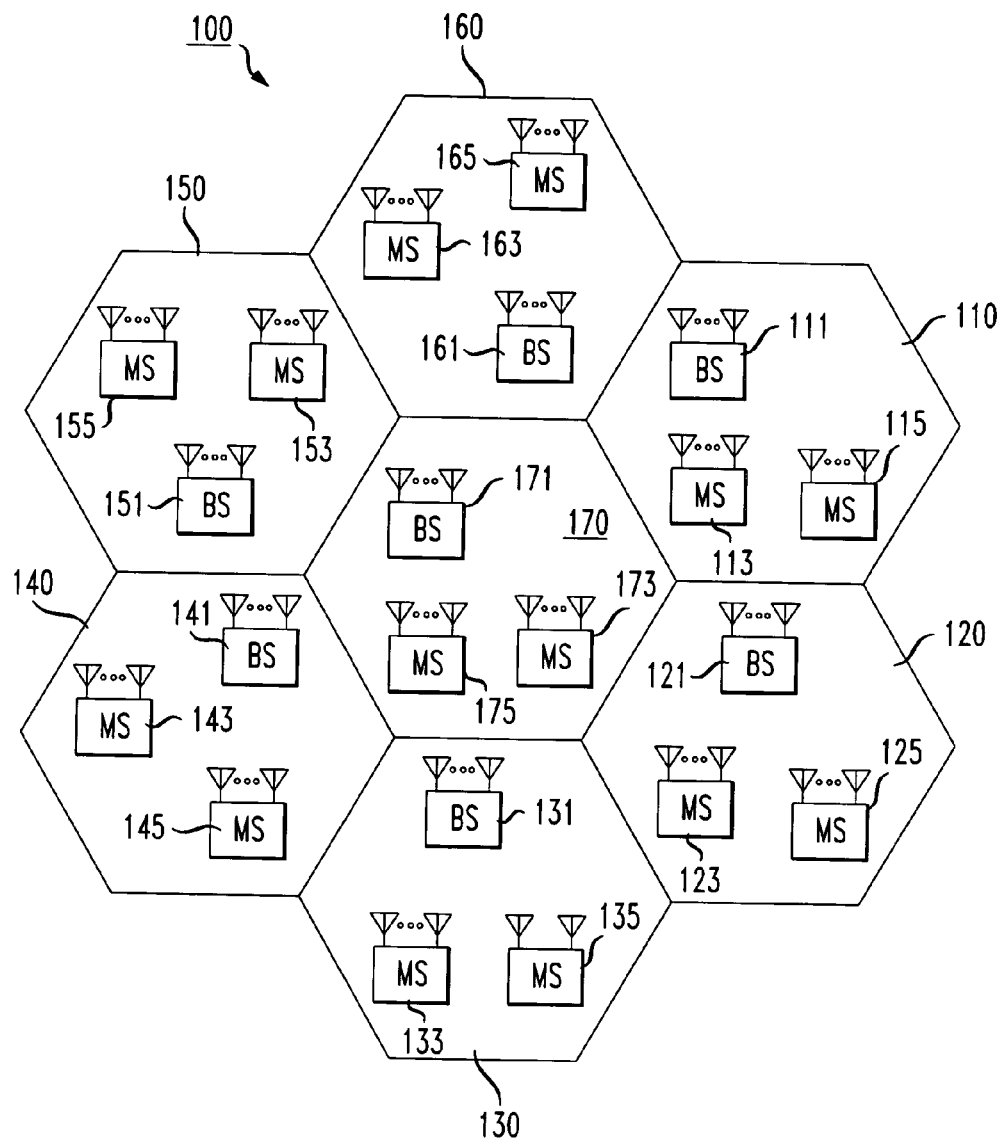
FIG. 1 depicts a cellular communication system, according to an embodiment of the invention.

A system and method for reducing interference in a wireless Multiple-Input-Multiple-Output (MIMO) system is disclosed. For example, interference from multiple transmissions in a cellular environment can be reduced through information exchanged by transmitters and receivers within the MIMO system. The information exchanged, for example, can include the interference powers of designated transmitters and/or the channel states of designated receivers.

In one embodiment, referred to herein as an uplink configuration, the basestations within a cellular system are coupled to a mobile switching center and the signals from all mobile stations are received and demodulated within the system. Because the mobile station transmitters have a number of transmitting antennas smaller than or equal to the number of transmitting antennas equal to the number of receiving antennas among the basestation receivers, all signals sent by the mobile stations can be received and separated by the basestations via the mobile switching center.

In this configuration, providing all signals (e.g., at the intermediate-frequency level) to a centralized mobile switching center may be an excessive amount of information. For example, such information can be an order of magnitude more than the actual data that are to be transmitted. Consequently, alternative embodiments use suboptimal forms of processing that require the exchange of less than full information between basestations.

In another embodiment, referred to herein as a downlink configuration, the basestations exchange information before transmission so that interference at the mobile stations is cancelled. For example, before transmission, the basestations can exchange among themselves the data to be transmitted from the basestations to the mobile stations. Based on this exchanged information, the data to be transmitted is precoded by the basestations and then sent to the receivers of the mobile stations. Alternatively or in addition to, before transmission, the basestations can exchange among themselves information about the channel state between the mobile stations and the basestations. Weights associated with basestation antennas are adjusted based on this information about the channel state.

These embodiments and others are described below in further detail. In these embodiments, the exchange of information between basestations can result in the reduction of interference and the increase in transmission capacity. Note that, generally speaking, the elements of the communication system described in reference to FIGS. 1 through 5 below can be configured for either an uplink configuration or a downlink configuration. Consequently, in alternative embodiments where only uplink configuration is possible, the components relevant to the downlink configuration can be embodied different than as described herein. Similarly, in alternative embodiments where only downlink configuration is possible, the components relevant to the uplink configuration can be embodied different than as described herein.

FIG. 1 depicts a cellular system 100 having cells 10 through 170, according to an embodiment of the invention. Each cell contains its own basestation and its own number of mobile stations. For example, cell 170 has a basestation 171 and two mobile stations 173 and 175. Although only two mobile stations 173 and 175 are shown within cell 170, it should be understood that many other mobile stations (not shown) could be located within cell 170. Cell 170 has six neighboring cells: 110, 120, 130, 140, 150, and 160. Each of these cells 110 through 160 has their own basestation 111 through 161, respectively, and their own mobile stations 113 and 115 through 163 and 165, respectively.

Figure 2:
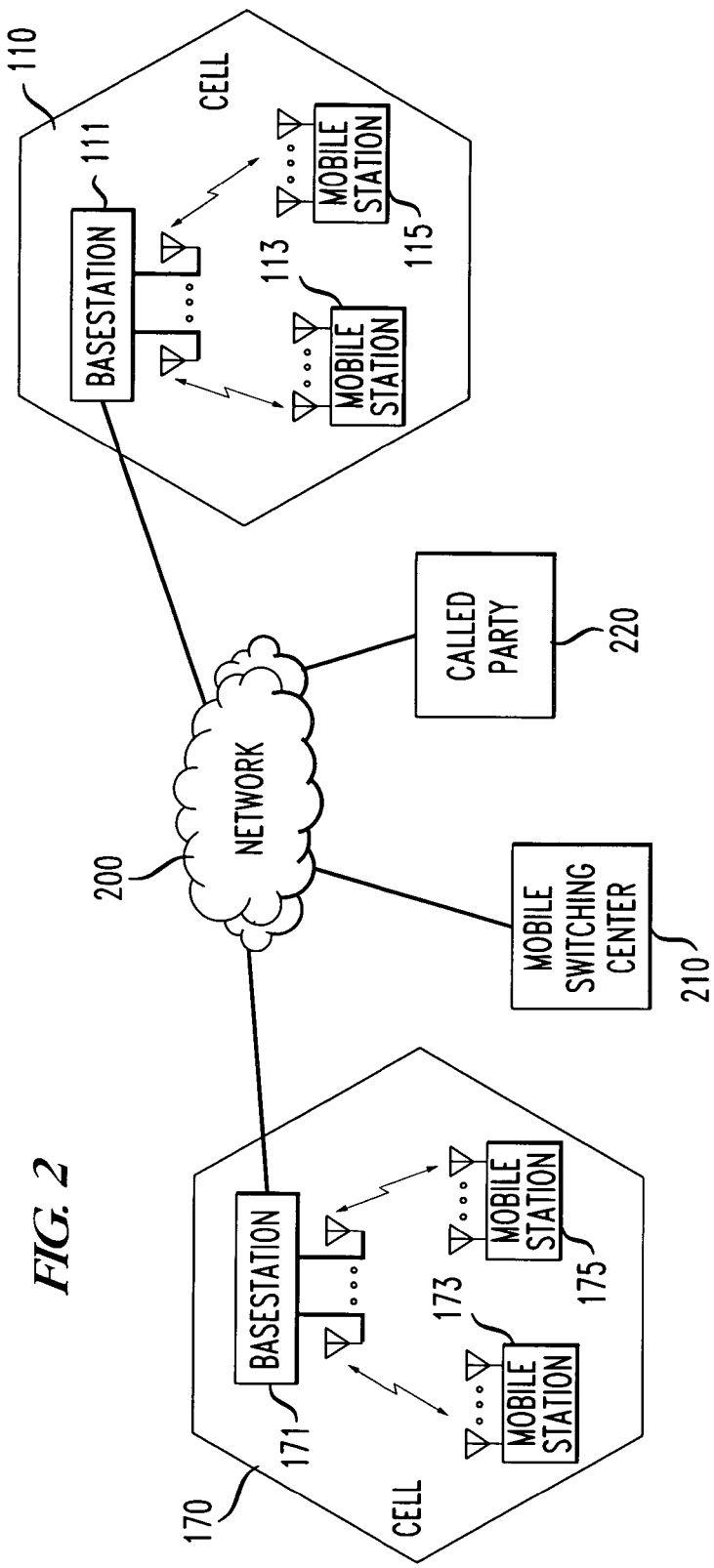
FIG. 2 depicts a block diagram of a portion of the cellular communication system shown in FIG. 1.

FIG. 2 depicts a block diagram of a portion of the cellular system shown in FIG. 1. As shown in FIG. 2, cells 110 and 170 are coupled to network 200, which is also coupled to mobile switching center 210 and called party 220. Network 200 can include, for example, one or more mobile networks connected to one or more non-mobile networks including, for example, the Public Switched Telephone Network (PSTN). Consequently, mobile stations within cellular system 100 can communicate with called party 220, which can be within or outside the cellular system 100.

In the embodiment shown in FIG. 2, mobile switching center 210 is connected to network 200 and is physically separate from basestations 111 through 171. In an alternative embodiment, the mobile switching center can be located with a particular basestation.

The mobile switching center 210 can receive information from certain transmitters within cellular system 100. For example, in this embodiment, basestations 111 through 171 within cellular system 100 can be the transmitters from which mobile switching center 210 receives signals.

FIG. 3 depicts a block diagram of the mobile switching center 210 shown in FIG. 2. The mobile switching center 210 has an input port 211, a joint detector 213, a processor 215, a decoder 217, and an output port 219. Input port 211 is coupled to joint detector 213, which is coupled to decoder 215. Decoder 215 is coupled to processor 217, which is coupled to output port 219.

Signals are received through the input port 211. For example, the input port 211 can be coupled to basestations 111 through 171 via wired connections (not shown), which can include connections through network 200. Thus, signals transmitted from basestations 111 through 171 are sent to the mobile switching center 210 through these wired connections. In another embodiment, the input port can be coupled the basestations within a cellular system via wireless connections.

Joint detector 213 jointly detects the signals received by the input port 211. Joint detector 213 also demodulates the received signals. Decoder 215 decodes the detected signals to produce the data originally transmitted.

Output port 219 can be, for example, coupled to basestations 111 through 171 via wired connections (not shown), which can include connections through network 200. In another embodiment, the output port is coupled to the basestations via wireless connections.

FIG. 4 depicts a block diagram of a basestation shown in FIG. 2. Although basestation 111 is selected for illustrative purposes, the block diagram shown in FIG. 4 is also representative of the remaining basestations 121 through 171 shown in FIG. 2. Basestation 111 has a receiver 230, antennas 231, transmitter 240 and antennas 241. Note that although antennas 231 associated with receiver 230 are shown as separate from antennas 241 associated with transmitter 240, these antennas can be the same. Receiver 230 includes analog-to-digital (A/D) converters 233 and demodulators 235. Transmitter 240 includes encoder 249, which includes weight-value selector 246. In addition, transmitter 240 includes digital-to-analog (D/A) converters 243 and modulators 247.

Receiver 230 is coupled to antenna elements 231. More specifically, each antenna element 231 is coupled to its own respective analog-to-digital (A/D) converter 233 of receiver 230. Each A/D converter 233, in turn, is coupled to its own respective demodulator 235.

While operating in the uplink configuration, the receiver 230 of basestation 111 is relevant. Antenna elements 231 receive signals for basestation 111 including desired signals and undesired signals. For example, antenna elements 231 receive desired signals sent by mobile stations 113 and 115 and undesired signals sent by basestations 121 through 171. Antenna elements 231 each produce a received signal uniquely associated with a respective antenna element 231. The received signal for each antenna element 231 is provided the respective analog-to-digital (A/D) converter 233. A/D converters 233 then produce a digital signal 234, which is provided to a respective demodulator 235 and is also provided to mobile switching center 210 via connections not shown in FIG. 4. Demodulators 235 each demodulate their respective digital signal to produce a signal for further processing by a processor (not shown) within basestation 111.

While operating in the downlink configuration, the transmitter 240 of basestation 111 is relevant. Weight-value selector 246 of encoder 249 is coupled to D/As 243, which are coupled in series to modulators 247 of transmitter 240. Each modulator 247 is coupled to its own respective antenna element 241.

Modulators 247 and weight-value selector 246 receive data to be transmitted from a processor (not shown) within basestation 111. This data to be transmitted, typically digital, is provided to weight-value selector 245, which treats the data to be transmitted as separate components and then assigns and modifies each component with its own weight value. Each modulator 247 modulates its own component with a carrier wave to produce a transmitted signal associated with a respective antenna 241. An overall transmitted signal is transmitted by antennas 241. FIG. 5 depicts a block diagram of the mobile station shown in FIG. 2. Mobile station 113 includes receiver 250, antenna elements 251, transmitter 260 and antenna elements 261. Note that although antennas 251 associated with receiver 250 are shown as separate from antennas 261 associated with transmitter 260, these antennas can be the same. Receiver 250 includes joint detector 253 coupled to a decoder 255. Receiver 250 is coupled to antenna elements 251. Transmitter 260 includes modulator 263 and is coupled to antenna elements 261. Although FIG. 5 is shown with respect to mobile station 113, the block diagram of FIG. 5 is also applicable for other mobile stations, such as those shown in FIG. 1.

While operating in the uplink configuration, the transmitter 260 of mobile station 113 is relevant. Transmitter 260 of mobile station 111 includes a modulator 263. Transmitter 260 is coupled to antenna elements 261. Modulator 247 modulates the data with a carrier wave to produce a transmitted signal. This transmission signal is then transmitted through the antenna elements 261.

While operating in the downlink configuration, the receiver 250 of mobile station 113 is relevant. Antenna elements 251 receive signals for mobile station 113 including desired signals and undesired signals. For example, antenna elements 251 receive desired signals sent by basestation 111 and undesired signals sent by mobile station 115 and basestations 121 through 171. Antenna elements 251 each produce a received signal uniquely associated with a respective antenna element 251. The received signal for each antenna element 251 is provided to joint detector 253. These received signals are jointly detected by joint detector 253 to produce a detected signal, which is provided to decoder 255. Decoder 255 decodes the detected signal to produce a decoded signal, which is provided to a processor (not shown) in mobile station 113.

Uplink Configuration

FIG. 6 depicts a flowchart showing a method for exchanging information among basestations in an uplink configuration, according to an embodiment of the invention. In this embodiment, all or a portion of signals associated with the mobile stations and sent to the basestations can be forwarded to and analyzed by the mobile switching center so that all data streams can be jointly detected without interference. In addition, training signals can be used to provide estimates of the channel impulse response from the transmitting antenna to the receiving antennas.

Note that the training signals can be established according to different protocols such as time-division multiplexing and frequency-division multiplexing, as described below in further detail. In embodiments where the training signals are based on frequency-division multiplexing, basestation to basestation interference typically does not occur. In embodiments where the training signals are based on time-division multiplexing, basestation to basestation interference typically may occur. Thus, although the description of the uplink configuration below is intended to be general enough to cover any type of protocol for the training signals, basestation to basestation interference is not relevant for embodiments based on frequency-division multiplexing.

At step 600, a training signal is sent from each mobile station to its associated basestation and from each basestation to the remaining basestations. At step 610, each basestation 111 through 171 receives the training signals from their associated mobile stations and from the remaining basestations. These training signals can be, for example, predetermined and known throughout the communication network. This allows the training signals to provide accurate channel estimates of the channel impulse response from each transmitting antenna to each receiving antenna, intercell and intracell. For example, mobile stations 113 and 115 each can send a training signal to basestations 111 through 171. Similarly, the mobile stations 123 and 125 through 173 and 175 each can send a training signal to their basestations 111 through 171. In addition, for example, basestation 11 sends a training signal to the remaining basestations 121 through 171; basestation 121 sends a training signal to the remaining basestations 111 and 131 through 171; and so on.

The training signals from can be, for example, time-division multiplexed, frequency-division multiplexed or code-division multiplexed thereby allowing the receiving basestation to distinguish the source of the training signal. In other words, a specific mobile station sending the training signal can be uniquely associated with a particular time slot, frequency or code for a respective basestation.

More particularly, where the training signals are time-division multiplexed for example, a given mobile station or basestation transmits its training sequence while all other mobile stations and basestations within the communication network are not transmitting their training signal and all receivers are listing to the training sequence transmission. This provides information on the channel state from the transmitters, including mobile station and basestations, to all receivers, including all mobile stations and all basestations. For the next time slot, a different given mobile station or basestation transmits its training sequence and all other mobile stations and basestations are not transmitting, and so on. To limit the number training signals being transmitted in a given round of transmissions, not all mobile stations and basestations within the entire communication network should transmit their training sequences in order within a given round of transmissions. Rather, mobile stations and basestations within one tier of interference transmit their training sequences in different time slots.

Note that within a given cell, the training signals are being received in essentially the same time period while, within different cells, the training signals are being received over different time periods. This difference in propagation distances and propagation times typically cannot be sufficiently address by a timing advance. Thus, guard intervals may be appended to the training signals.

Where the training signals are frequency-division multiplexed for example, training signals for different antennas (or different cells) are transmitted on different frequencies. In this embodiment, frequency guard bands can be used to account for in the Doppler effect in the transmitted training signals. These frequency guard bands may be small or potentially unneeded, for example, in a wireless local-area network.

Where the training signals are code-division multiplexed for example, training signals can be based on the simultaneous transmission of linearly independent (or orthogonal) sequences. The sequences within one tier of interference can be linearly independent while the sequences within the second tier of interference can reuse the original sequence. The sequences for the different cells can be synchronized by, for example, Global Positioning System (GPS) synchronization (e.g., in cellular system analogous to IS-95), or by exchange of information between the basestations.

Note that certain embodiments can use a combination of multiplexing formats where each cell uses a different multiplexing format. For example, in one embodiment, a given cell can use training signals using code-division multiplexing while a different cell can use training signals using time-division multiplexing.

At step 620, the signals associated with mobile stations 113 and 115 through 173 and 175 are sent to their respective basestations 111 through 171. These signals can be, for example, the signals associated with a call or session between a mobile station (e.g., mobile station 175) and a called party 220. Following this example, rather than directly routing the signals associated with mobile station 175 through 200 from mobile switching center 210 to called party 220, the signals associated with mobile station 175 and received from basestations 111 through 171 are collectively processed at mobile switching center 210 before being routed to called party 220.

At step 630, the signals associated with mobile stations 113 through 175 are sent from basestations 111 through 171 to the mobile switching center 210. For example, the signal associated with mobile station 113 and the signal associated with mobile station 115 are sent from basestation 111 to mobile switching center 210. Similarly, the signals for the remaining mobile stations 123 and 125 through 173 and 175 are sent from basestations 121 through 171, respectively, to mobile switching center 210. Consequently, the signals associated with all of the mobile stations 113 through 175 are forwarded by the respective basestations 111 through 171 to mobile switching center 210. At step 640, these signals are received at mobile switching center 210 from basestations 111 through 171.

At step 650, the signals associated with the mobile stations and received from the basestations 111 through 171 are jointly detected by the mobile switching center 210. At step 660, the jointly detected signals are decoded by the mobile switching center 210 to produce decoded signals each of which is associated with a called party. For example, the decoded signals can each be uniquely associated with a different called party. Following a specific example, a signal sent by mobile station 175 and intended for called party 220 is jointly detected with the signals sent by the remaining mobile stations at step 650, decoded at step 660 and then forward to called party 220 at step 670.

As illustrated by the above discussion in reference to FIG. 6, an uplink configuration in general can be based on all or a portion of signals sent by the basestations that are analyzed at the mobile switching center so that all data streams can be jointly detected without interference. Because providing all signals (e.g., at the intermediate-frequency level) to a centralized mobile switching center may be an excessive amount of information, alternative embodiments can use suboptimal forms of processing that require the exchange of less than full information between basestations. For example, FIG. 7 depicts a flowchart showing a method for exchanging information among basestations in an uplink configuration, according to an embodiment of the invention.

In the embodiment shown in FIG. 7, each basestation 111 through 171 processes the signals associated with some of the mobile stations 113 through 175. For example, basestations 111 through 171 can process the signals from the closest mobile stations 113 and 115 through 173 and 175, respectively. Alternatively, the basestations 111 through 171 can process the strongest signals from the mobile stations 113 through 175, even if from mobile stations outside of the cell associated with the respective basestation 111 through 171. Then, each basestation 111 through 171 can jointly detect its received signals from their respective mobile stations, decode those detected signals, and exchange the decoded data with the remaining basestations 111 through 171. Each basestation 111 through 171 can subtract, from its signals received from its respective mobile stations, the contribution of the decoded data received from the remaining basestations 111 through 171. Note that in this embodiment, each basestation 111 through 171 can process its own data without a centralized location such as mobile switching center 210. Alternatively, a centralized location can be used for processing the signals from the mobile stations. This method is described in fuller detail below.

At step 700, a training signal is sent from each mobile station to its associated basestation. At step 710, each basestation 111 through 171 receives the training signals from their associated mobile stations. These training signals can be similar to those described above in reference to FIG. 6.

At step 720, the signals associated with the mobile stations are received by the basestations 111 through 171. For example, basestations 111 through 171 can receive the signals from the closest mobile stations 113 and 115 through 173 and 175, respectively. Alternatively, the basestations 111 through 171 can receive the strongest signals from the mobile stations 113 through 175, even if from mobile stations outside of the cell associated with the respective basestation 111 through 171.

At step 730, each basestation 111 through 171 jointly detects the signals received from the respective mobile stations. At step 740, each basestation 111 through 171 decodes the detected signals. At step 750, each basestation 111 through 171 sends its decoded signals to each remaining basestation 111 through 171. For example, basestation 111 sends its decoded signals to basestations 121 through 171.

Steps 760 through 780 are performed for each remaining basestation 111 through 171. In other words, steps 760 through 780 are performed with respect to each basestation 111 through 171 based on the remaining basestations 111 through 171. For example, steps 760 through 780 are repeated for each basestation 121 through 171 with respect to basestation 111. Similarly, steps 760 through 780 are repeated for each basestation 111 and 131 through 171 with respect to basestation 121, and so on.

At step 760, each basestation 111 through 171 calculates the interference power of each decoded signals received from the remaining basestation 111 through 171. For example, basestation 111 calculates the interference power of the decoded signal received from basestation 121, the interference power of the decode signal received from basestation 131, through to the interference power of the decoded signal received from basestation 171. The other basestations 121 through 171 similarly calculate the interference power for their remaining basestations.

At conditional step 770, a determination is made, for each basestation, as to whether the interference power for each remaining basestation 111 through 171 exceeds a pre-determined threshold. If the interference power for the basestation 111 through 171 does not exceed a pre-determined threshold, then the process proceeds to step 790. If the interference power for that basestation 111 through 171 exceeds a pre-determined threshold, then the process proceeds to step 780. For example, for basestation 111, a determination is made as to the remaining basestations 121 through 171. If the interference power of the decoded signal received from basestation 121 exceeds the threshold, then step 780 is performed with respect to basestation 121; if the interference power of the decoded signal received from basestation 131 exceeds the threshold, then step 780 is performed with respect to basestation 131; and so on.

At step 780, the contribution of the decoded signals of the particular remaining basestation is subtracted from the basestation being considered. For example, with respect to basestation 111, the contribution of the decode signals from the remaining basestations 121 through 171 having an interference power exceeding the pre-determined threshold is each subtracted from the decoded signals for basestation 111. At step 790, the decoded signals for each basestation are forwarded to the called party.

Note that the uplink configuration described in connection with FIG. 6 is one of many possible uplink configurations. For example, the confidence of particular channel estimates can be computed at each basestation and used during an iterative procedure for the subtraction of interference. By way of background, one possible error is error propagation from data streams that are incorrectly demodulated due to insufficient signal-to-interference ratio (SIR) or due to wrong channel estimate. Consequently, by computing the confidence of the channel estimates at each basestation, the error propagation can be minimized. In one embodiment, the basestations each estimates the SIR and the resulting error propagation, then accordingly informs the respective mobile station to adjust its transmit power or coding rate to reduce the error propagation to acceptable levels. Alternatively, each basestation can use error detection schemes to determine the accuracy of decoded data, and then accordingly can inform the respective mobile station to adjust its transmit power or coding rate to reduce the error propagation to acceptable levels.

In another embodiment, some basestations do not demodulate the signals received from their respective mobile stations before subtracting the contribution from interference sources. Rather, these basestations can subtract the contributions from strong interferers before demodulating the signals received their respective mobile stations. This can be particularly effective in the cases where the mobile station transmitted signals have be demodulated reliably by other basestation and the channel estimates from the interfering sources are reliable as well.

In yet another embodiment, "soft information" is exchanged among the basestations in addition to the signals sent by the basestations that are jointly detected by the mobile switching center without interference. This soft information can include, for example, log-likelihood ratio (i.e., the confidence with which a decision was made by a basestation). This soft information can be considered as an analogue quantity, which can be discretized with different levels of accuracy— the higher the accuracy, the larger the amount of data that are exchanged between basestations.

In principle, each bit of exchanged information can have a different level of confidence, because this level of confidence is a function of the instantaneous SIR, which is a function of the transmitted bits at other antennas (both the antennas of the user and the antennas of the interference sources). The factor in the confidence level, however, is the channel characteristics (e.g., attenuation), which change relatively slowly. Consequently, the differential confidence can be used: transmit the confidence for the first bit absolutely (with a relatively high accuracy), and then transmit the deviation from this confidence as the bits change. Because the channel characteristics change relatively slowly, the number of bits to be transmitted in quantized form to express the differential confidence level can be relatively small.

In yet another embodiment, the bits before a decoder and decision device can be exchanged among the basestations. This embodiment is similar to sending the intermediate signals and can involve a similar amount of bandwidth.

Downlink Configuration

Following this example, mobile stations 173 and 175 can receive desired signal from basestation 170 while at the same time receiving undesired signals from basestations 111 through 161 in neighboring cells 10 through 160, respectively, and from mobile stations 113 and 115 through 163 and 165 in neighboring cells 110 through 160, respectively. In such an example, these undesired signals may interfere with the desired signals received at mobile stations 173 and 175.

Figure 8:
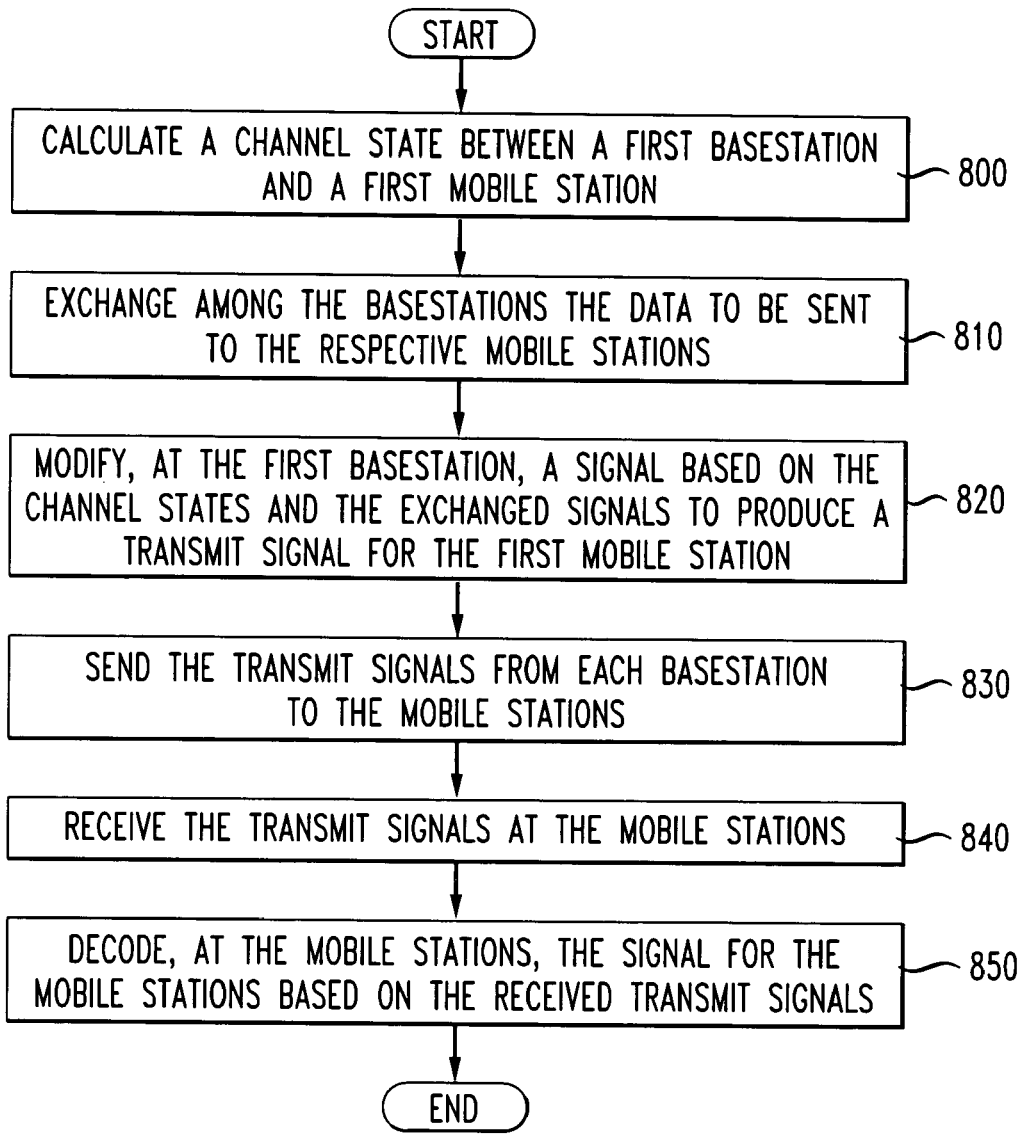
FIG. 8 depicts a flowchart of a method for exchanging information among basestations in an downlink configuration, according to an embodiment of the invention.

FIG. 8 depicts a flowchart of a method for exchanging information among basestations in a downlink configuration, according to an embodiment of the invention. Unlike the uplink configuration described above for example in reference to FIGS. 6 and 7 where the receivers at the basestations could exchange information (e.g., by wired connections), the exchange of information between the receivers in the downlink configuration is difficult. For example, receivers in the downlink configuration are located at the mobile stations and therefore cannot be interconnected by wired connections. Consequently, embodiments described herein allow the exchange of information by the basestations in a way to reduce interference at the mobile stations.

Such exchanged information can be signals precoded with the data to be transmitted. Alternatively, weights for the transmitting antennas at the basestations can be adjusted based on the information about the channel state between the mobile stations and the basestations. Such approaches allow the interference at all receiving antennas of all of the mobile stations to be simultaneously reduced, allow the interference at certain mobile stations having a SIR significantly less than its signal-to-noise ratio (SNR) to be suppressed, or the interference at certain mobile stations to be increased so that it can be better detected and suppressed by multiuser detector in those mobile stations.

Figure 9:
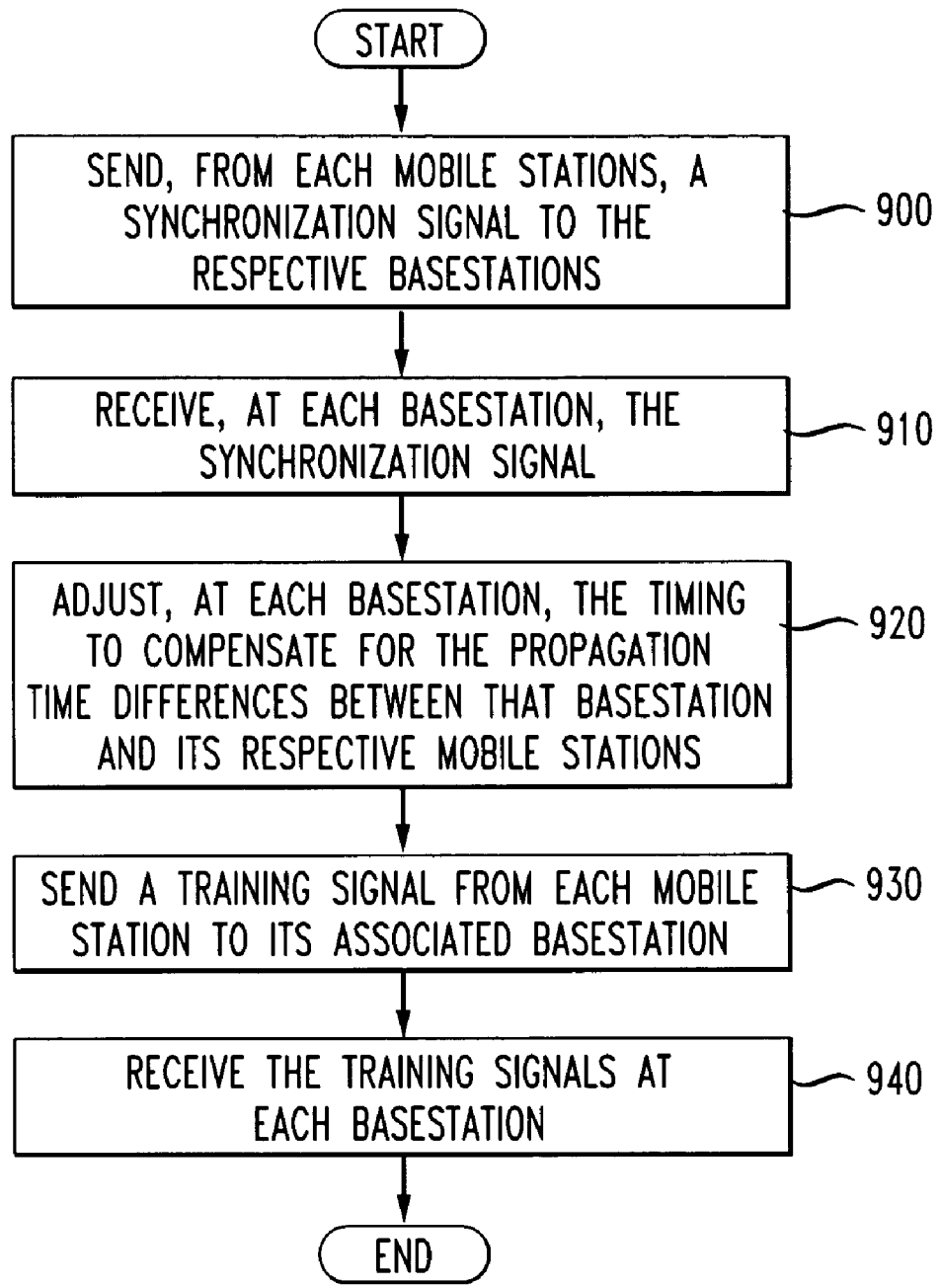
FIG. 9 depicts a flowchart for a method to synchronize a MIMO cellular system, according to an embodiment of the invention.

At step 800, a channel state between a basestation and a mobile station is calculated. The channel state is indicative of the environmental channel between a basestation and a mobile station and the data to be transmitted. Information about the propagation channel between the basestation and the mobile station can be based on such factors as, for example, atmospheric conditions and multipath conditions. The channel state can be calculated, for example, through the use of training sequences to identify channels between several basestations and several mobile stations within the communication network. FIG. 9 depicts a flowchart for using training signals to determine the channel states of the communication system in a downlink configuration, according to an embodiment of the invention.

At step 900, a predetermined synchronization signal sent from each mobile station 113 through 175 to its respective basestation 111 through 171. At step 910, the synchronization signals are received at the basestations 111 through 171. At step 920, each basestation 111 through 171 adjusts its timing (e.g., by analogue or digital delay lines) to compensate for the propagation time differences between that basestation and its respective mobile stations. At step 930, training signals are sent from the mobile stations 113 through 175 to their respective basestations 111 through 171. At step 940, these training signals are received by basestations 111 through 171. Based on these synchronized training signals, accurate channel estimates of the channel impulse response between the basestations and the mobile stations within the communication network can be determined. Alternatively, the training sequences can be transmitted from the basestations to the mobile stations, and the channel estimates as computed by the mobile stations can be provided back to the basestations. In these embodiments, the training sequences associated with a given basestation can be orthogonal, while the training sequences from different basestations can be sent out at different times, frequencies or codes.

Returning to FIG. 8, at step 810, basestations 111 through 171 exchange the data to be sent to their respective mobile stations. For example, before basestation 111 sends a signal to each respective mobile stations such as mobile station 113, basestation 111 forward those signals to the remaining basestations 121 through 171. Similarly, basestations 121 through 171 also send their signals to be transmitted to their respective mobile stations to their respective remaining basestations 111 through 171.

At step 820, each basestation 111 through 171 modifies the signals to be transmitted to their respective mobile station based on the channel states and the exchanged signals from the remaining basestations. In other words, the basestation can modify or "pre-code" transmission signals associated with its multiple transmitting antennas based on the current channel state between that basestation and the desired mobile station, the current channel states between the remaining basestations and that desired mobile station, and the exchanged signals from the remaining basestations. For example, before basestation 111 transmits a data signal to mobile station 113, basestation 111 modifies the data signal based on the channel state between basestation 111 and mobile station 113, the channel states between basestations 121 through 171 and mobile station 113, and the signals to be transmitted by basestations 121 through 171.

At step 830, each basestation 111 through 171 sends transmit signals to their respective mobile stations 113 through 175. At step 840, the mobile stations 113 through 175 receive the modified transmit signal. At step 850, the mobile stations 113 through 175 each decode the transmit signal received from their associated basestation 111 through 171.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. A method executed in a multiple-input-multiple-output (MIMO) system having a plurality of basestations each being associated with one or more mobile stations, where each of the base stations has its own plurality of antennas, and each of the mobile stations has its own plurality of antennas, comprising:
    a first of said basestation (BS-A) receiving a plurality of signals from its associated one or more mobile stations (BS-A mobile signals), each of the BS-A mobile signals being burdened by interfering signals from others of said one or more mobile stations that are associated with BS-A and mobile stations that are associated with a second of said basestations (BS-B);
    BS-B, which is geographically removed from BS-A, receiving a plurality of signals from its associated one or more mobile stations (BS-B mobile signals), each of the BS-B mobile signals being burdened by interfering signals from others of said one or more mobile stations that are associated with BS-B and mobile stations that are associated with (BS-A);
    gathering said BS-A mobile signals and the BS-B mobile signals at a processing unit; and
    in said processing unit, executing on the gathered signals joint detection that reduces said burden of interfering signals on each of said BS-A mobile signals and said BS-B mobile signals.

2. A method for reducing interference within a multiple-input-multiple-output (MIMO) system having a plurality of basestations including a first basestation and a second basestation, comprising:
    receiving a plurality of signals at the first basestation, the first basestation having its own plurality of antenna elements, the first basestation being associated with its own plurality of mobile stations each having their own plurality of antenna elements, each signal from the plurality of signals received at the first basestation being uniquely associated with a mobile station from a plurality of mobile stations associated with the first basestation;
    receiving a plurality of signals at the second basestation, the second basestation having its own plurality of antenna elements, the second basestation being associated with its own plurality of mobile stations each having their own plurality of antenna elements, each signal from the plurality of signals received at the second basestation being uniquely associated with a mobile station from a plurality of mobile stations associated with the second basestation; and
    jointly detecting the plurality of signals received at the first basestation in conjunction with the plurality of signals received at the second basestation to produce a plurality of detected signals, further comprising:
    calculating an interference power associated with the plurality of signals received at the second basestation;
    decoding a detected signal from the jointly detected signals received at the first basestation and the second basestation based on the interference power associated with the plurality of signals received at the second basestation when the interference power associated with the plurality of signals received at second basestation exceeds an interference-power threshold; and
    decoding the detected signal from the plurality of signals received at the first basestation independent of the interference power associated with the plurality of signals received at the second basestation when the interference power associated with the plurality of signals received at the second basestation is below the interference-power threshold.

3. The method of claim 1, wherein:
    number of antenna elements from a plurality of antenna elements for the first basestation corresponds to number of antenna elements from a plurality of antenna elements for each mobile station from the plurality of mobile stations associated with the first basestation; and
    number of antenna elements from a plurality of antenna elements for the second basestation corresponds to number of antenna elements from a plurality of antenna elements for each mobile station from the plurality of mobile stations associated with the second basestation.

4. The method of claim 1, wherein said step of gathering is executed in a mobile switching center, the mobile switching center being located separately from the first basestation and the second basestation.

5. The method of claim 1, wherein the first basestation jointly detects the plurality of signals received at the first basestation and the second basestation.

6. An apparatus for use within a Multiple-Input-Multiple-Output (MIMO) system including a first basestation having its own plurality of antenna elements, a second basestation having its own plurality of antenna elements, a plurality of mobile stations associated with each basestation, each mobile station having its own plurality of antenna elements, comprising:
    an input port configured to receive a plurality of signals received at the first basestation and a plurality of signals received at the second basestation; and
    a joint detector coupled to the input port configured to produce a plurality of detected signals based on a the plurality of signals received at the first basestation in conjunction with the plurality of signals received at the second basestation, further comprising:
    a processor coupled to the input port, the processor configured to calculate an interference power and a channel state associated with the plurality of signals from received at the second basestation;

a joint decoder coupled to the joint detector and the processor, the joint decoder configured to jointly decode the plurality of signals received at the first basestation based on the plurality of signals received at the second basestation when an interference power associated with the plurality of signals received at the second basestation exceeds an interference-power threshold; and the joint decoder configured to decode the plurality of signals received at the first basestation independent of the plurality of signals received at the second basestation when the interference power associated with the plurality of signals received at the second basestation is below the interference-power threshold.

* * * * *